Nov. 22, 1932.   A. D. RICCIA   1,888,569

SYSTEM FOR AUTOMATICALLY CONTROLLING THE SPEED OF ELECTRIC MOTORS

Filed Jan. 6, 1930   4 Sheets-Sheet 1

ANGELO DELLA RICCIA
INVENTOR
BY
ATTORNEY

Nov. 22, 1932. A. D. RICCIA 1,888,569
SYSTEM FOR AUTOMATICALLY CONTROLLING THE SPEED OF ELECTRIC MOTORS
Filed Jan. 6, 1930 4 Sheets-Sheet 4

ANGELO DELLA RICCIA
INVENTOR
BY
ATTORNEY

Patented Nov. 22, 1932

1,888,569

UNITED STATES PATENT OFFICE

ANGELO DELLA-RICCIA, OF BRUSSELS, BELGIUM

SYSTEM FOR AUTOMATICALLY CONTROLLING THE SPEED OF ELECTRIC MOTORS

Application filed January 6, 1930, Serial No. 418,886, and in France January 7, 1929.

The present invention relates to improvements in the system employed for the automatic operation of controllers for electric motors described in applicant's application Serial No. 279,593. In said application, a system is disclosed in which the controller is automatically operated by a relay which is subjected to a differential combination of a variable E. M. F. U constantly varying with the actual speed of the electric motors and a fixed E. M. F. U' dependent upon the operating position of said controlling device.

The improvements according to the invention chiefly consist in a multiple device for varying the intensity of the action of said differential combination in order to accelerate or to slow at several degrees the starting and the braking of the motors.

Figure 1:
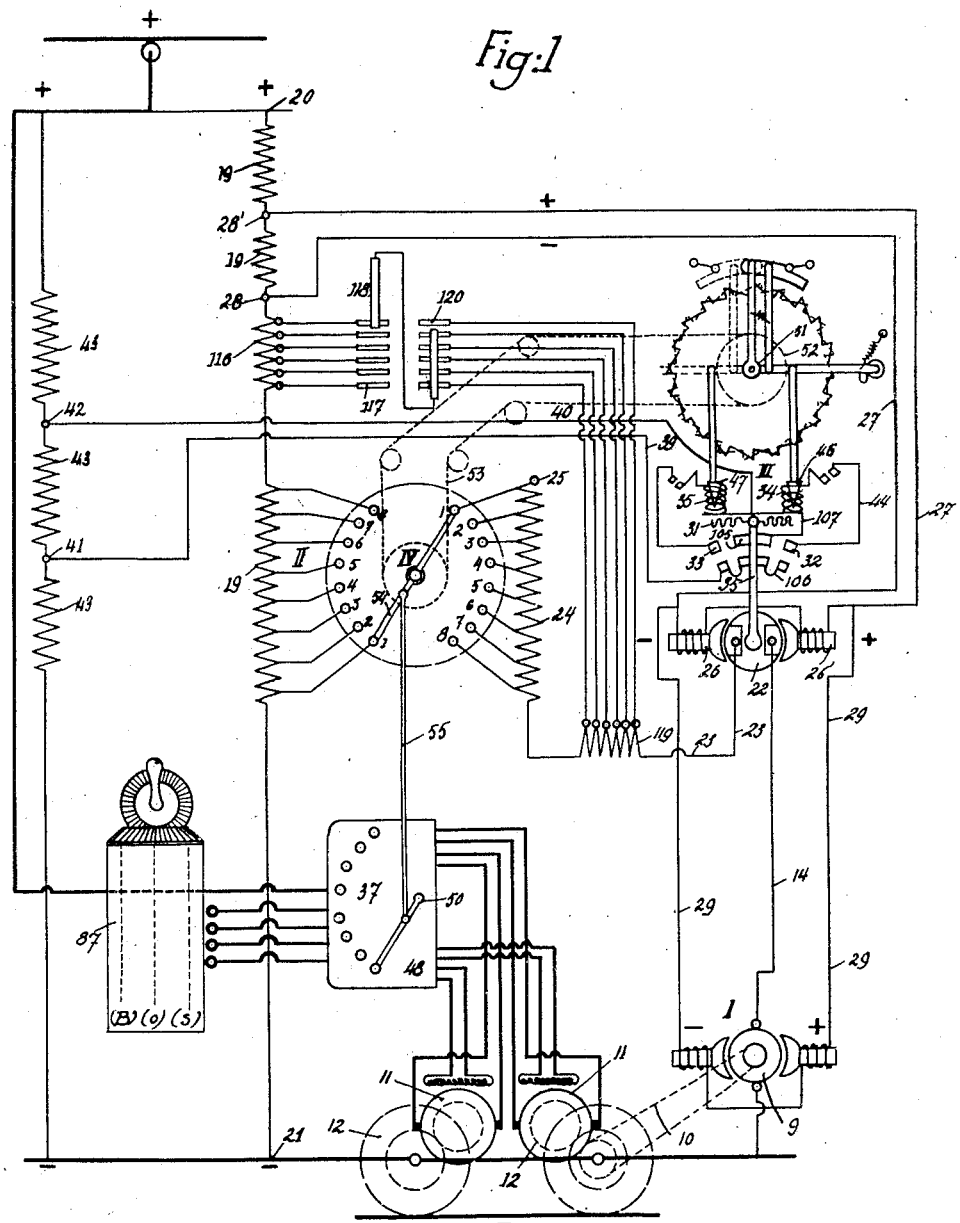
Figure 2:
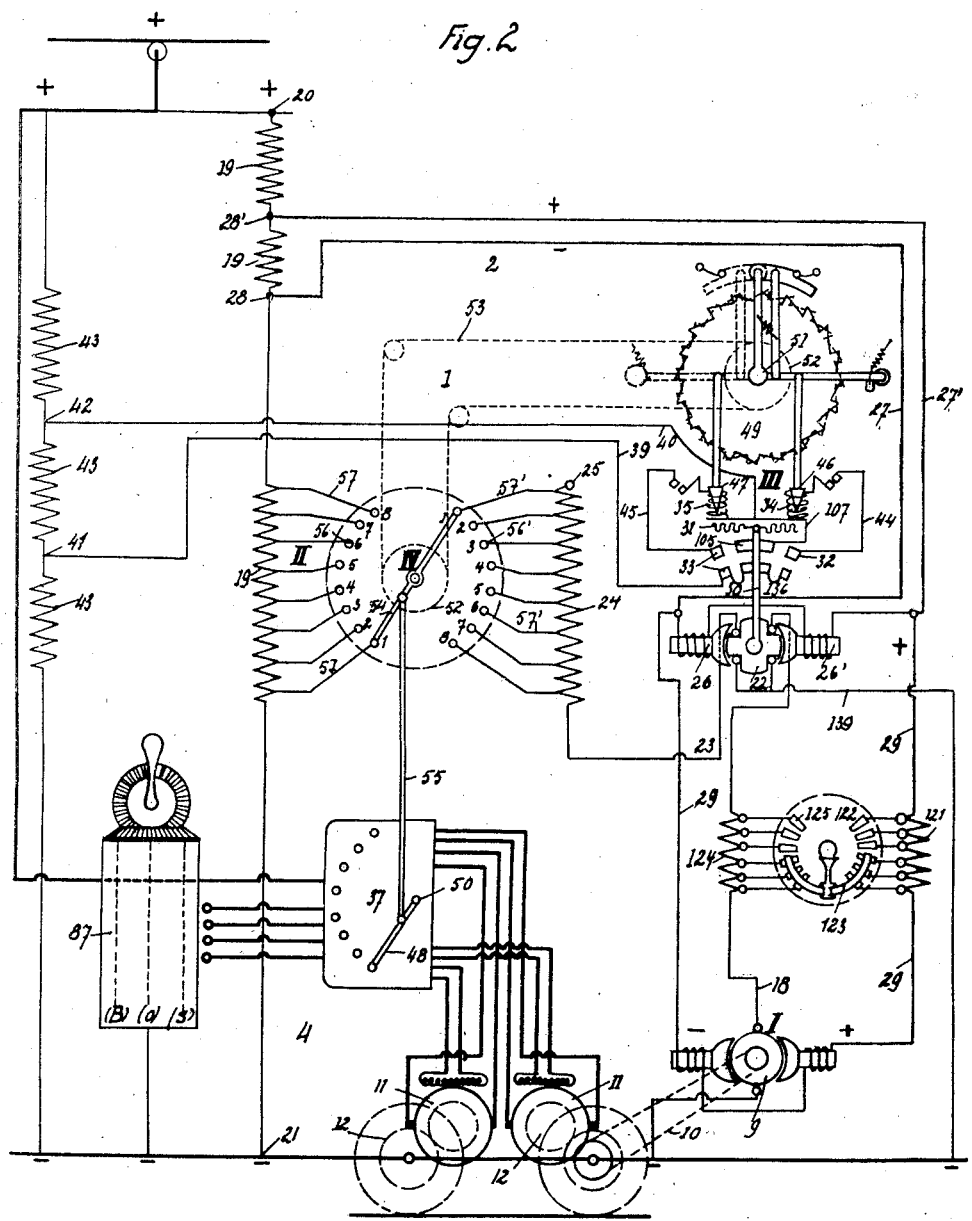
Figure 3:
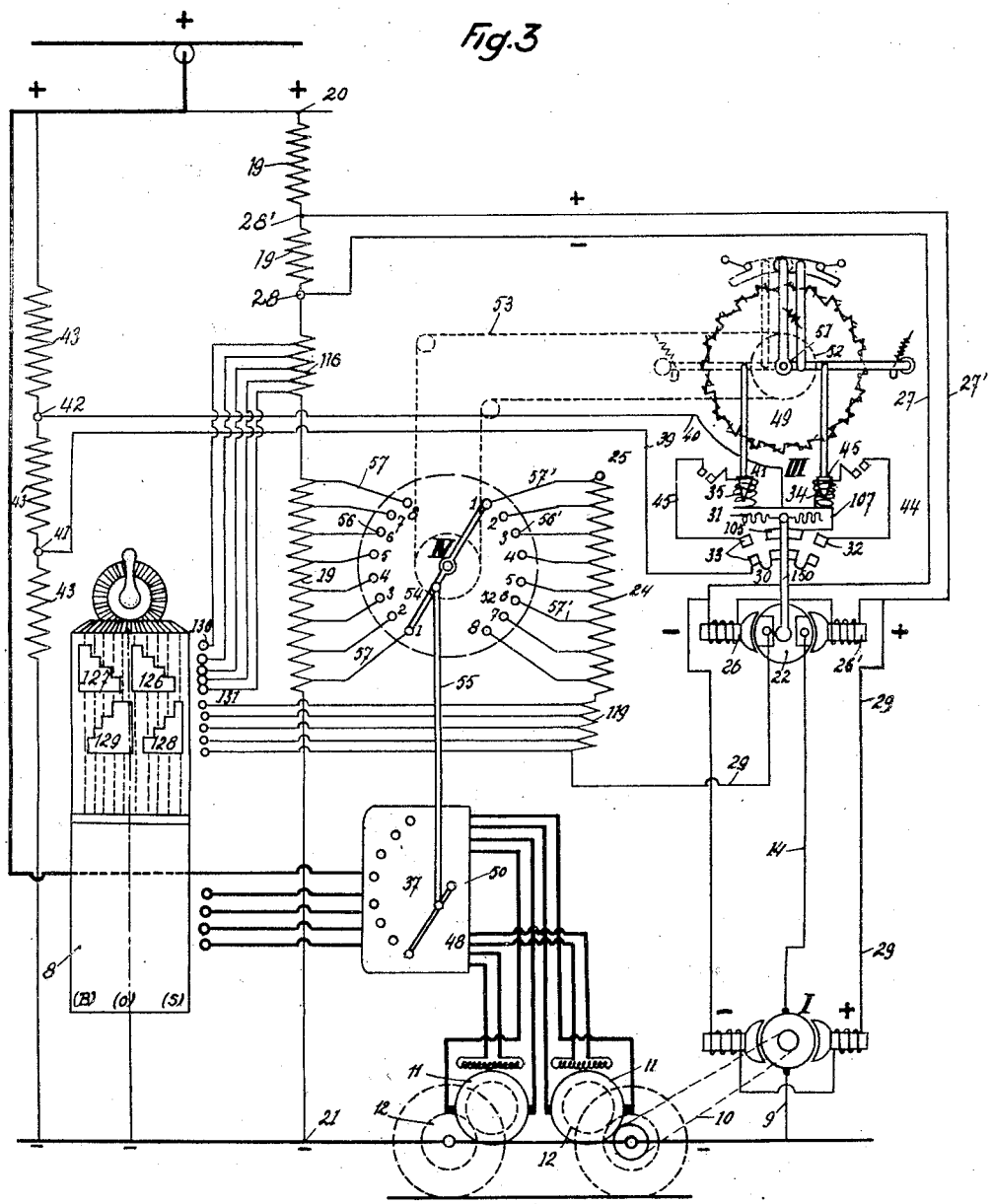
Figure 4:
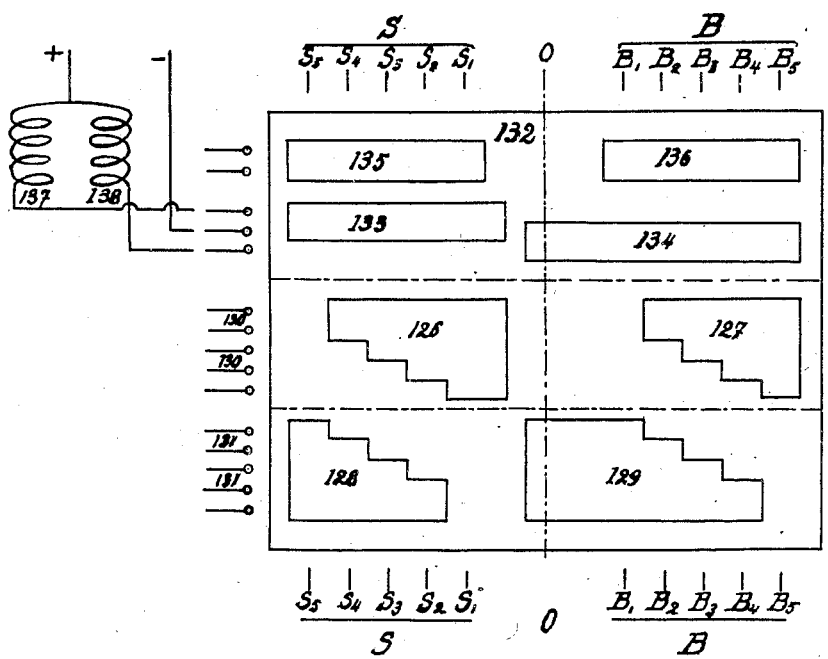

The accompanying drawings permit to clearly explain the invention. Fig. 1 relates to the case in which the multiple device acts upon the device furnishing the fixed E. M. F. U'. Fig. 2 relates to the case in which this device acts upon the device for constantly varying the E. M. F. U. Fig. 3 shows the combination of the device represented in Fig. 1 with a starting and braking reversing device of known type. Fig. 4 shows another arrangement.

The invention which is shown in its general arrangement in Fig. 1 comprises two motors 11 and 12 controlled in the known manner by a controller 37 and a starting and braking reversing apparatus 87 to prepare in the usual manner the principal connections required for the starting and the braking and to open or close the circuit; said controller 37 which is supposed to comprise an element 48 rotating on the axle 50, is automatically operated by means of a relay 22 which in turn controls an actuator relay 36 of a special type adapted to displace the rotating element 48 by means of suitable mechanism 49 and driving gear 54—55 and simultaneously the rotating element 48 by means of the coupling lever 55.

The said relay 22 is subjected on the one hand to the action of springs 31, and on the other hand to the action of two E. M. F.'s U and U' acting upon it in opposite directions, U being proportional to (or a function of) the speed N of the train or other vehicle operated by the controller (or motors driving this vehicle), U' being chosen among a series of fixed E. M. F.'s corresponding to the regulating steps or operating positions of the controller, each E. M. F. U' being equal to the value of U when the speed of the mover driven by the motor passes through a special predetermined value in relation to the corresponding regulating step. This opposition of the E. M. F. U and the E. M. F. U' upon the relay 22 is effected by the use of a multiple switch 54 cooperating with a set of terminals (1) (2) .... (k) .... (8) which are supplied with the different E. M. F.'s U', and this switch is operatively connected to the controller in such manner that the transfer from one notch of this latter to the other will cause the transfer of the switch from one notch to the other, thus changing the particular E. M. F. U' which is opposed to the E. M. F. U.

The E. M. F. U is generally obtained from a small dynamo 9 which is driven in a suitable manner at a speed proportional to that of the mover or the motors 11 which drive the same. The different E. M. F.'s U' corresponding to the different notches of the controller are furnished by devices of a somewhat variable nature, of which the most simple consists of a potentiometric resistance 19 supplied by the tension V of the outside line supplying the motors; this resistance is subdivided into different parts having suitable proportions in order to produce the different E. M. F.'s U' between a common terminal 21 and different successive terminals (1) (2) ... (k) ... (8).

When the speed N actually attained by the motors exceeds the predetermined speed corresponding to the notch $k$ occupied at this time by the controller 37, by a certain quantity M, the E. M. F. U will also exceed the E. M. F. U' by a certain quantity $v$, and in these conditions the relay 22, acting upon the actuator 36, moves the controller 37 forward from notch $k$ to notch $k+l$. On the contrary, when the speed N descends below the speed $N_k$ by a certain quantity M, the E. M. F. U' will exceed the E. M. F. U by a certain quantity $v$, and the relay 22, acting in the contrary direction upon the actuator 36, moves the controller back from notch $k$ to notch $k-1$.

This forward or backward motion of the controller causes a corresponding forward or backward motion of the switch 54, in such manner as to appropriate the system to a new value of the speed N of the motors, whereby the whole arrangement will continue to operate properly.

As specified in patent application No. 279,593, it may be necessary in certain cases to modify the scale of the predetermined speeds which control the transfer from one notch of the controller to another, and this is effected by means of resistances which are inserted into the circuit furnishing the E. M. F. U or into the circuit furnishing the E. M. F.'s and are short-circuited or de-short-circuited at will by means of respective switches.

In order that the relay 32 may operate for mean rates of speed varying according to the aforesaid conditions it shall be provided arrangements adapted to modify, in conformity with these variations, the intensity of the action due to the two E. M. F.'s U and U' which are in opposition to the fixed tension of the reaction springs 31, which intensity may represent the sensitiveness of the relays 22; these arrangements consist in inserting, after the rheostat 24 by which the circuit of the potentiometric resistance 19 is closed, an additional resistance, or in changing the exciting current of the dynamo 9. In the case in which these changes in the series of mean speeds are adapted to accelerate or to slow up the starting and the braking, the said device for changing the sensitiveness of the relay 22 may be operatively connected with the device adapted to change the series of mean speeds.

The improvements in the aforesaid arrangement according to the present invention chiefly consist in the use, in this latter case, of a device for accelerating or slowing the starting and the braking, which is of the multiple type, that is, it affords accelerations and delays at several degrees which may gradually increase by reason of a gradual change of the series of mean speeds $N_n$, and also in the use of a multiple device adapted to produce a corresponding change of the sensitiveness of the relay 22, that is, of the intensity of the action which sets it in operation (E. M. F.'s U and U', and antagonistic spring 31).

In Fig. 1 the multiple device for accelerating or slowing the starting and the braking is constituted by a resistance 116 which is divided into several elements connected by suitable conductors to a set of contact pieces 117; said elements may thus be short-circuited or de-short-circuited in greater or less number by the slide or movable device 118 which is controlled by hand or by a servomotor. The said slide may move upon a straight path, as herein represented, or on a circular path (as shown by 123 in Fig. 3 and as will be further described). The starting or the braking can be accelerated or slowed in a gradual manner between a very slow starting or a very rapid braking, and a very rapid starting and a very slow braking.

As concerns the device adapted to change the sensitiveness of the relay 22, it may consist of a resistance 119 which is mounted in the circuit 23 of the winding of this relay which is subjected to the opposite E. M. F. U and U'. This resistance 119 is also divided into several elements, connected with contact pieces 120, which can be successively short-circuited or de-short-circuited, and the device for placing said contact-piece 120 successively in or out of circuit may be combined with the one by which the contact pieces 117 of the elements of the resistance 116 are placed out of or in circuit, the slide 118 having a suitable form for this purpose.

As shown in Figure 2, the multiple accelerating or slowing devices with gradual action are adapted to act upon a resistance 121 which is mounted, in the exciting circuit of the dynamo 9 supplying the E. M. F. U: said resistance is divided into several elements connected by suitable conductors to a set of contact pieces 122 which may be successively placed in or out of the circuit by the slide 123 which is shown as movable on a circular path.

The device adapted to change the sensitiveness of the relay 22 consists as before of a resistance 124 which is mounted in the circuit of the armature of said relay, but it will be noted in Figure 2 that the relay instead of being provided with a single armature winding, comprises two windings whose circuits separately supplied by the dynamo 9 and the switch 54 respectively, are closed by means of the ground wire 139. The resistance 124 which is then placed in the circuit of the dynamo 9 is divided into several parts connected to contact pieces 125 which are placed successively out or in circuit by the slide 123 above mentioned.

The devices serving to accelerate or to slow up the starting or the braking, and also the device by which the sensitiveness of the relay 22 is changed in consequence, is not necessarily controlled by a special handle, but may be controlled by the handle already employed to control in the known manner the starting and braking reversing device 87, or the starting and connecting device which may be substituted for this latter.

Fig. 3 is an example of the arrangement adopted in this case, and it shows how a more or less rapid starting or braking can be effected at will by the operating of the corresponding reversing device. Herein it has been supposed that the two necessary adjustments are made by acting upon the two resistances 116 and 119 as in Fig. 2, but an arrangement which is quite similar may be used in the case in which it is desired to act upon the resistances 121 and 124 (Fig. 2), or in any other manner required by the other conditions specified in the application.

In this event, the starting and braking reversing device comprises, in addition to the part 87 which serves to prepare in the known manner the principal connections of the motors required for starting or braking, and to make or close the circuit, and herein two pairs of contact pieces 126—127 and 128—129 will respectively short-circuit or de-short-circuit the resistances 116 and 119 in a progressive manner.

For this purpose, the starting and braking reversing device has several successive starting positions ($S_1$) to ($S_5$) and several successive braking positions ($B_1$) to ($B_5$), instead of a single one of each kind, and the contact pieces 126—127 and 128—129 have a notched form in such manner that they will be enabled to act successively upon the different contact pieces 130 and 131 which are connected to the different elements of the resistances 116 and 119.

In the position $S_1$ the resistance 116 is entirely shunted by the contact piece 126 (which increases the mean speeds of starting and reduces the corresponding efforts) and the resistance 119 is entirely placed in the circuit of the relay 22 (which reduces the sensitiveness of this apparatus). In this position, the starting is more slow.

In the position $S_5$, the resistance 116 is entirely placed in the circuit of 19 (which reduces the mean speeds of starting and increases the corresponding efforts) and the resistance 119 is entirely short-circuited by the contact piece 128 (which increase the sensitiveness of the relay 22. In this position, the starting is more rapid.

In the intermediate positions $S_2$ $S_3$ $S_4$, the pieces 126 and 128 short-circuit a greater or less amount of the resistances 116 and 119, and the starting is effected with intermediate positive accelerations.

In the position $B_1$, the resistance 116 is entirely inserted in the circuit of 19, (which lowers the mean speeds of the braking and reduces the corresponding efforts), and the resistance 119 is entirely short-circuited by the contact-piece 129, (which increases the sensitiveness of the relay 22). In this position the braking is the slowest.

In the position $B_5$, the resistance 116 is entirely short-circuited by the contact piece 127, (which increases the mean speeds of braking and increases the corresponding efforts), and the resistance 119 is entirely inserted into the circuit of the relay 22, (thus reducing its sensitiveness). In this position, the braking is more rapid.

In the intermediate positions $B_2$ $B_3$ $B_4$, the contact pieces 127 and 129 short-circuit a greater or less amount of the resistances 116 and 119, and the braking is effected with intermediate negative accelerations.

In the said device, a starting or a braking of a more energetic nature is obtained by simply pushing more or less far the handle which serves for the normal starting or braking. By this combination, the driver's controlling operation becomes more rapid and responsive.

If the starting braking reversing apparatus is not directly controlled by hand, but is under distant control by a suitable servo-motor, more simple arrangements may be employed.

Fig. 4 shows an arrangement which may be employed in this case.

The starting braking reversing apparatus (not shown) has only two positions, that is, a starting position and a braking position which latter is to be maintained during the operation on no current and when the moving body is stopped. In the present example, the passage from one position to another is effected by the operating controller 132 which has three main positions (S), (O), (B).

Upon this controller are provided two sets of contact pieces 133 and 134 on the one hand and 135 and 136 on the other hand. The pieces 133 and 134 act upon the electromagnets 137 and 138 which place the reversing apparatus in the starting position or in the braking position. The contact pieces 135 and 136 close the connections between the traction motors and the apparatus supplying them.

In the position O of the controller, the reversing apparatus is in the braking position, but the aforesaid connections are broken; in the positions (S) and (B), the reversing apparatus is brought successively to the starting position while the connections of the motors are again established.

The starting braking reversing apparatus 87 (Fig. 3) is indirectly operated by the operating controller 132, the pieces 126—127 adapted to effect (by means of the resistance 116) the slowing up or the accelerating of the starting or the braking, and the pieces 128 and 129 adapted to modify in consequence (by means of the resistance 119) the sensitiveness of the relay 22, are mounted on the controller, of which the two extreme positions are subdivided into several (for instance from $S_1$ to $S_5$ and from $B_1$ to $B_5$).

To effect a more or less rapid starting or braking, the driver of the train turns the handle of the operating controller 132 (Fig. 4) to a greater or less degree in the proper direction.

When electric braking is not used, that is when the equipment comprises, instead of a simple starting braking reversing apparatus a simple starting connecting apparatus, under direct or indirect control, the contact pieces relative to the braking 127, 129, 134, 136 are eliminated and the contact pieces for starting, such as 126, 128, 133 are lengthened if necessary as far as the position O of the starting connecting device or of the controller operating the same (however with the exception of the piece 135 controlling the connections of the motors to the apparatus supplying them, which are now permanent connections).

I claim:

1. In a system for automatically controlling the speed of electric motors comprising in combination, a number of motors and their mover, a controlling device for controlling the speed of said motors and having a plurality of operating positions, means controlled by the speed of said mover for automatically generating a variable E. M. F. depending directly at each moment on the actual instantaneous value of the speed of said mover, means for supplying a plurality of E. M. F.'s in steps progressively corresponding to said controlling device positions, means responsive to a combined E. M. F. of one polarity and of a determined value for advancing said controller in one direction and responsive to a combined E. M. F. of opposite polarity of a determined value for returning said controller in the opposite direction, means operatively connected to said controlling device for automatically impressing said first and one of the second E. M. F.'s upon said third means to render said third means responsive to a differential combination of said E. M. F.'s—means to obtain a progressive change of the sequence of mean speeds corresponding to said controlling device positions in order to realize a multiple device for the accelerating and the slowing of the starting and the braking and thus to proceed from a given starting or braking to several startings or brakings more rapid or less rapid than the first.

2. In a system for automatically controlling the speed of electric motors as defined in claim 1, means acting upon the means for supplying a plurality of E. M. F.'s to obtain a progressive change of the sequence of the mean speeds corresponding to the controlling device positions.

3. In a system for automatically controlling the speed of electric motors as defined in claim 1 and comprising as means for supplying a plurality of E. M. F.'s a potentiometric direct current resistance with plurality of elementary resistances, a plurality of auxiliary resistances in series with the aforesaid means for successively short-circuiting and de-short-circuiting said auxiliary resistances in order to obtain a progressive change of the sequence of the mean speeds corresponding to the controlling device positions.

4. In a system for automatically controlling the speed of electric motors as defined in claim 1, means acting upon the means for automatically generating a variable E. M. F. to obtain a progressive change of the sequence of mean speeds corresponding to the controlling device positions.

5. In a system for automatically controlling the speed of electric motors as defined in claim 1 and comprising as means automatically generating the variable E. M. F. a direct current dynamo, means acting upon the excitation circuit of said dynamo in order to obtain a progressive change of the sequence of the mean speeds corresponding to the controlling device positions.

6. In a system for automatically controlling the speed of electric motors as defined in claim 1, means to progressively change the value of the combined E. M. F. to which the means for advancing and returning the controller are responsive and means to change at the same time the sequence of mean speeds corresponding to the controlling device positions.

7. In a system for automatically controlling the speed of electric motors as defined in claim 1 and comprising as means responsive to a combined E. M. F. of a determined value for advancing and returning the controller a relay supplied by a circuit in which the variable E. M. F. and one of the plurality of E. M. F.'s are in opposition, a resistance divided in several parts and placed in said circuit, means to short-circuit and de-short-circuit the several parts of said resistance in order to modify the value of the combined E. M. F. to which said relay is responsive and means to obtain at the same time a progressive change of the sequence of mean speeds corresponding to the controlling device positions.

8. In a system for automatically controlling the speed of electric motors as defined in claim 1 and comprising as means responsive to a combined E. M. F. of a determined value for advancing and returning the controller a relay supplied by a circuit in which the variable E. M. F. and one of the plurality of E. M. F.'s are in opposition, a resistance divided in several parts and placed in said circuit, means to short-circuit and de-short-circuit the several parts of said resistance in order to modify the value of the combined E. M. F. to which said relay is responsive and means to obtain at the same time a progressive change of the sequence of mean speeds corresponding to the controlling device positions, and a single medium controlling said both means in agreement together.

9. In a system for automatically controlling the speed of electric motors as defined in claim 1 and comprising as means responsive to a combined E. M. F. of a determined value for advancing and returning the controller a relay supplied by a circuit in which the variable E. M. F and one of the plurality of E. M. F.'s are in opposition, a resistance divided in several parts and placed in said circuit, means to short-circuit and de-short-circuit the several parts of said resistance in order to modify the value of the combined E. M. F. to which said relay is responsive and means to obtain at the same time a progressive change of the sequence of mean speeds corresponding to the controlling device positions, and connecting means between said both means and the controller in order that said both means will be controlled in agreement together by the handle of the controller.

In testimony whereof I have signed this specification.

ANGELO DELLA-RICCIA.